US011877576B2

(12) United States Patent
Zlotnik et al.

(10) Patent No.: US 11,877,576 B2
(45) Date of Patent: Jan. 23, 2024

(54) DIPHENYL TABLETS AND METHODS OF PREPARING THE SAME

(71) Applicant: Ideaz, LLC, McKees Rocks, PA (US)

(72) Inventors: Clifford Barry Zlotnik, Sewickley, PA (US); Harry Joseph Velgich, Canonsburg, PA (US)

(73) Assignee: Ideaz, LLC, McKees Rocks, PA (US)

( * ) Notice: Subject to any disclaimer, the term of this patent is extended or adjusted under 35 U.S.C. 154(b) by 114 days.

(21) Appl. No.: 16/973,463

(22) PCT Filed: Jun. 21, 2019

(86) PCT No.: PCT/US2019/038441
§ 371 (c)(1),
(2) Date: Dec. 9, 2020

(87) PCT Pub. No.: WO2019/246503
PCT Pub. Date: Dec. 26, 2019

(65) Prior Publication Data
US 2021/0251221 A1    Aug. 19, 2021

Related U.S. Application Data

(60) Provisional application No. 62/688,550, filed on Jun. 22, 2018.

(51) Int. Cl.
*A01N 27/00*  (2006.01)
*A01N 25/08*  (2006.01)
*A01N 25/34*  (2006.01)

(52) U.S. Cl.
CPC ............ *A01N 27/00* (2013.01); *A01N 25/08* (2013.01); *A01N 25/34* (2013.01)

(58) Field of Classification Search
CPC .............................. A01N 27/00; A01N 25/08
See application file for complete search history.

(56) References Cited

U.S. PATENT DOCUMENTS

| | | | |
|---|---|---|---|
| 2,797,199 A | 6/1957 | Chittum | |
| 3,284,275 A | 11/1966 | Nelson | |
| 3,300,420 A | 1/1967 | Frey | |
| 3,413,218 A | 11/1968 | Einsel | |
| 3,962,362 A | 6/1976 | Suggitt | |
| 4,171,340 A | 10/1979 | Nishimura et al. | |
| 5,135,744 A * | 8/1992 | Alexander | A01N 25/002 424/DIG. 8 |
| 6,395,303 B1 | 5/2002 | Staniforth et al. | |
| 7,205,445 B2 | 4/2007 | Yanagawa et al. | |
| 8,415,268 B2 | 4/2013 | Eger et al. | |
| 9,596,848 B2 | 3/2017 | Zlotnik et al. | |
| 2005/0112202 A1* | 5/2005 | Lerner | A61K 31/663 424/470 |
| 2007/0092547 A1* | 4/2007 | Birnbaum | A01N 25/34 424/769 |
| 2010/0016382 A1 | 1/2010 | Nomura et al. | |
| 2010/0267786 A1 | 10/2010 | Al-Fayoumi et al. | |
| 2014/0023708 A1 | 1/2014 | Harada et al. | |
| 2017/0105408 A1 | 4/2017 | Caruel et al. | |

FOREIGN PATENT DOCUMENTS

| | | | |
|---|---|---|---|
| CN | 203768275 U | 8/2014 | |
| EP | 1954788 A1 * | 8/2008 | ............ C10L 1/14 |
| WO | WO-0053009 A1 * | 9/2000 | ............ A01N 25/04 |

OTHER PUBLICATIONS

Robertson, Nature, 1961, 191, 593-594.*

* cited by examiner

*Primary Examiner* — Kyle A Purdy
(74) *Attorney, Agent, or Firm* — The Webb Law Firm

(57) ABSTRACT

A method for making diphenyl tablets includes compressing diphenyl crystals. The diphenyl tablets produced from the method can be used to inhibit fungal growth, repel and/or kill insects and rodents, and/or prevent corrosion in a space by placing the diphenyl tablets into the space such that diphenyl vapor permeates into the space.

10 Claims, No Drawings

DIPHENYL TABLETS AND METHODS OF PREPARING THE SAME

CROSS REFERENCE TO RELATED APPLICATIONS

This application is the United States national phase of International Application No. PCT/US2019/038441 filed Jun. 22, 2018, which claims priority to U.S. Provisional Patent Application No. 62/688,550 filed Jun. 22, 2018, the disclosures of which are hereby incorporated by reference in their entirety.

BACKGROUND OF THE INVENTION

Field of the Invention

The present invention relates to consolidated diphenyl tablets and methods of making diphenyl tablets.

Description of Related Art

Currently, there are a number of solutions for protecting items stored within an enclosure from moisture. One option to attempt to control the moisture in enclosed spaces is through the use of desiccants most commonly packaged into small packets. Desiccants are hygroscopic materials that induce dryness in environments by readily absorbing moisture present in the air. Chemically inert desiccants such as silica gel, clay, activated carbon, calcium sulfate, and molecular sieve remove moisture from the air and retain it.

Further, desiccants adsorb a ratio of moisture compared to the weight of the desiccant and, therefore, have a maximum capacity to remove moisture based on the dry weight of the desiccant. After absorbing the maximum capacity, no additional moisture can be removed. For example, when silica gel has adsorbed up to 50% of its own weight in moisture, it becomes super saturated and will not remove additional moisture. Once saturated with moisture, silica gel can be regenerated by heating to 250° F. for 1-2 hours. Calcium chloride (Damp Rid) is another type of desiccating substance that combines with airborne moisture to form a messy, viscous, and corrosive liquid brine solution.

It is appreciated that it's hard to predict the weather in advance and the amount of desiccant needed to protect items during storage. For instance, as weather and environmental conditions over the long term are unpredictable, consumers commonly either utilize an insufficient quantity of desiccant subjecting their property to harm or add costly amounts of additional desiccant to try and compensate. Situations also exist where it is impractical to remove excess moisture. As such, desiccant packets have significant limitations when used to protect items from moisture, especially items placed in storage.

Other solutions have been attempted to protect items within enclosures from moisture, but these solutions are unable to meet the needs of the industry because they are unnecessarily/impractically large and cumbersome, destructive, and/or lack the necessary longevity. Still other solutions seek to protect items within enclosures by cooling the enclosures with air conditioning while lowering the temperature such that excess moisture is not removed; however, these solutions also fail to meet industry needs because they are inefficient and costly.

Seeking a state of equilibrium with the surrounding environment, the moisture content of hygroscopic materials is constantly changing as materials continually gain or lose moisture. Moisture vapor is invisible, so consumers are often unaware of its presence. The majority of items stored by consumers, outdoors in basements or in unconditioned temporary storage facilities are stored with little or no consideration of potential moisture related damage and are thus stored either inadequately or unprotected. Items such as leather goods, wood furniture, clothing, shoes, books and documents, upholstered furniture, and the like are vulnerable to moisture damage including fungal degradation, fungal staining, and fungal odors. In moist environments, metals are also subject to oxidation and corrosion. This damage is especially prevalent in humid climates or where there is an excess of moisture such as along coastlines, on watercraft, in basements, and in storage units.

To address the above issues, the present inventors have found a new, alternate, and superior approach to provide moisture protection to items sealed in closed containers during storage by using diphenyl tablets that release diphenyl vapor to proactively permeate the environment and inhibit fungal growth, function as a barrier to oxidation and corrosion, and deter insects and rodents. Diphenyl is a dry crystalline substance known to sublime pass directly from a solid to a vapor. Among other characteristics, diphenyl has also be found to exhibit fungal inhibiting and deodorizing properties.

It is therefore desirable to provide diphenyl tablets that effectively provide moisture protection for items stored in various types of enclosures. It is also desirable to provide a conveniently sized solidified tablet form of diphenyl for inclusion with materials vulnerable to fungal attack for protection while placed in closed containers during transportation, moving, and storage. It is further desirable to provide a diphenyl vapor delivery system which delivers diphenyl vapor slowly and over extended periods of time (e.g., months to years).

SUMMARY OF THE INVENTION

The present invention relates to a method for making diphenyl tablets comprising compressing diphenyl crystals into diphenyl tablets with a device that applies a selected pressure onto the crystals. The diphenyl crystals can be compressed using a tableting machine and a tooling set comprising an internal cavity. The diphenyl crystals can be compressed at a pressure within a range of from 1 to 7 tons.

The present invention relates to a method for making diphenyl tablets that includes compressing diphenyl crystals into diphenyl tablets with a device that applies a selected pressure onto the crystals. The diphenyl crystals can be compressed with a tableting machine and a tooling set comprising an internal cavity. Further, the diphenyl crystals can be compressed at a compressing pressure within a range of from 0.5 to 7 tons.

The method can further include forming a perforation through a portion of the tablet. For example, the perforation can be formed through a middle of the tablets such that the tablets are formed into a shape of a ring. The tablets can also be formed with concave or convex sides. In addition, the method can further include compressing at least one additional ingredient with the diphenyl crystals such that the additional ingredient is incorporated into the diphenyl tablet.

The present invention also relates to a tablet that includes diphenyl, in which the diphenyl in the tablet is formed from compressed diphenyl crystals. The tablet can include at least one concave or convex side, and/or perforations formed through at least a portion of the tablet, such as through a middle of the tablet such that the tablet is formed into a shape of a ring. The tablet can have 100 weight % of diphenyl, based on the total weight of the tablet.

Alternatively, tablet can have less than 100 weight % of diphenyl, based on the total weight of the tablet. In such examples, the tablet can further include at least one ingredient selected from the group consisting of binders, lubricants, flowing agents, glidants, lubricants, fragrances, bittering agents, hardeners, and mixtures thereof. For example, tablet further comprises a bittering agent selected from the group consisting of denatonium benzoate, denatonium saccharide, and combinations thereof.

The present invention also relates to a method of inhibiting fungal growth, repelling or killing insects or rodents, or preventing corrosion in a space comprising placing a diphenyl tablet as previously described into the space and allowing diphenyl vapor to permeate from the tablet throughout the space.

In some examples, the space contains insects or rodents, and the method includes allowing the diphenyl vapor to permeate such that the diphenyl vapor repels the insects or rodents away from the space and/or kills the insects or rodents. In another example, the space contains at least one metal substrate, and the method includes coating a surface of the metal substrate with the diphenyl vapor by allowing the diphenyl vapor to permeate onto the surface of the metal substrate such that the diphenyl vapor prevents corrosion of the metal substrate. In a further example, the space contains footwear, and the method further includes allowing the diphenyl vapor to permeate onto an inside and/or outside portion of the footwear such that the diphenyl vapor inhibits fungal growth of the footwear. It is appreciated that the diphenyl tablets can be used to perform at least two or even all of the above methods at once.

The present invention can also include a method of delivering at least two chemicals in vapor form into a space comprising placing a diphenyl tablet as previously described, and which further comprises a second different chemical formed in the tablet, into the space, and allowing the tablet to sublime such that both diphenyl vapor and vapor from the second different chemical permeate throughout the space.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Further, the terms "upper," "lower," "right," "left," "vertical," "horizontal," "top," "bottom," "lateral," "longitudinal," and derivatives thereof shall relate to the invention as it is oriented in the drawing FIGURES. However, it is to be understood that the invention may assume alternative variations and step sequences, except where expressly specified to the contrary. It is also to be understood that the specific devices and processes illustrated in the attached drawings, and described in the specification, are simply exemplary embodiments of the invention. Hence, specific dimensions and other physical characteristics related to the embodiments disclosed herein are not to be considered as limiting.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The present invention includes methods of preparing diphenyl tablets and diphenyl tablets prepared therefrom. The compound "diphenyl", as used herein, is also referred to as "biphenyl". It is appreciated that diphenyl (also referred to as biphenyl) is represented by [Molecular Formula] $C_{12}H_{10}$.

The method of the present invention includes compressing diphenyl crystals into diphenyl tablets. The diphenyl crystals used with the present invention can include diphenyl crystal flakes. An example of a suitable commercially available diphenyl crystal flakes that can be used with the methods of the present invention are available from Eastman Chemical Company under the product name Biphenyl, Flake.

The methods of the present invention can with a device that applies a selected pressure onto the crystals. A non-limiting example of a device that can apply pressure onto diphenyl crystals to form diphenyl tablets includes a tableting machine and a tooling set having an internal cavity configured to both receive diphenyl crystals and hold them in place during compression. An example of a tableting machine includes a mechanical device that compresses powders into tablets of uniform size, shape, and weight containing approximately the same quantity of ingredients.

The tableting machine can include, for example, a manual hand pill press. It was surprisingly found that a hand pill press (such as a hand pill press having 3 part dies and using hammer strikes) can be used to successfully compress diphenyl crystals into pharmaceutical sized tablets at pressures of as little as 100 pounds.

Another non-limiting example of a device that can be used to form the diphenyl tablets of the present invention is a TDP-5 Desktop Tablet Press commercially available from LFA Tablet Presses and which can produce up to 5,000 tablets per hour. Yet another example of a device that can be used to form the diphenyl tablets of the present invention is a Cherry Burrell/Colton Model 216 16 Station Rotary Tablet Press with a maximum pressure of 6,000 lbs. and which is capable of producing up to 800 tablets per minute.

It is appreciated that the diphenyl tablets can be prepared by applying various pressures onto the diphenyl crystals. The compression pressures for making the diphenyl tablets of the present invention are typically selected between 0.5 and 7 tons, such as for example within a range of from 1 to 6 tons or from 1.5 to 5 tons.

The methods of the present invention can also utilize blending devices to prevent diphenyl crystals from clumping together. Non-limiting examples of such devices include a suitably sized Vee blender with an intensifier bar or Stokes Tornado Mill that can be used to break up clumps of diphenyl crystals prior to placing the crystals into the tableting machine.

The methods of the present invention have also demonstrated a high conversion rate of diphenyl raw material to the finished tablet. Tablets are therefore produced with minimal waste. The remnant materials that are produced from tableting and broken, defective, or blemished tablets can also be easily reprocessed for reuse by grinding without material loss. As such, leftover partially used product can be reused. The diphenyl tablets were also found to have a long service life (months to years). Further, when compared, the visible reduction in size between a used and unused tablet allows one to determine the remaining service life of the tablet.

The methods and devices of the present invention can be used to provide diphenyl tablets having any desired size. For instance, the present invention can be used to provide diphenyl tablets having a size range of the common size of pharmaceutical tablets up through a hockey puck size or larger. The methods and devices of the present invention can also form diphenyl tablets having various shapes. For example, the diphenyl tablets of the present invention can be prepared with concave sides or convex sides. The diphenyl tablets may have any suitable shape including, but not limited to, triangular, round, square, rectangular, oval, diamond, ring, and the like.

The diphenyl tablets can also be prepared or modified to include perforations. The perforations can be formed through various areas of the tablets. For example, the perforations can be formed through the entire middle of the tablet resulting in a ring shape. The diphenyl tablets can include one or multiple perforations. It is appreciated that the perforations can influence delivery of the diphenyl vapor by increasing the rate of emission as compared to a solid non-perforated tablet that will decrease the rate of emission. The perforations can be formed using a separate device capable of forming perforations such as by punching holes into the tablets, or by using a tableting machine that can also form perforations such as by punching holes into the tablets. The tools used with the previously described devices can be selected from various metal grades such as a Natoli S7, S5, or S1 steel punch with Ultracoat.

It was surprisingly found that the diphenyl tablets are readily compressible into firm durable tablets having suitable/desirable characteristics without the addition of other ingredients including processing agents such as binders, lubricants, flowing agents, glidants, lubricants, hardeners, and the like. As a result, the finished tablets may contain up to 100 weight % of diphenyl, based on the total weight of the tablet. That is, the diphenyl tablets can be completely free of components other than the diphenyl ingredient including being completely free of any of the additional processing agents previously described.

It is appreciated that additional ingredients (e.g., binders, lubricants, flowing agents such as silicone dioxide, glidants, lubricants, hardeners, and/or the like) can be incorporated into the diphenyl tablets to provide different characteristics and performance. For instance, aroma chemicals can be incorporated into tablets to add fragrance. Further, while diphenyl has low oral toxicity, bittering agents, such as for example denatonium benzoate and denatonium saccharide, may be added to prevent ingestion by children and pets. Other additional ingredients can include chemicals that are known to undergo sublimation such as camphor, naphthalene, ortho dichlorobenzene, and mixtures thereof. The additional ingredients can also include chemicals that do not typically undergo sublimation and which can sublime when combined with diphenyl in the tablets described herein due to the sublimation of diphenyl, which acts as a vapor delivery mechanism for such chemicals.

It is appreciated that when additional ingredients are used, the finished tablets will have less than 100 weight % of diphenyl, such as for example in an amount of from 10 weight % to 99 weight % of diphenyl, or from 50 weight % to 99 weight % of diphenyl, or from 60 weight % to 99 weight % of diphenyl, based on the total weight of the tablet. It is appreciated that an amount of diphenyl can be selected within any sub range of the previously mentioned weight ranges of diphenyl. The amount diphenyl can also be selected based on the additional ingredients. For instance, when additional ingredients that do not typically undergo sublimation are also used to form the tablets, the amount of diphenyl can be at least greater than 50 weight %, based on the total weight of the tablet, such that diphenyl acts as a vapor delivery mechanism. The diphenyl tablets may be multilayered tablets which allow additional functions to be accomplished simultaneously, such as when a plurality (e.g., 2 or 3) of active ingredients work best for their intended functions when separated into separate layers and not mixed or combined together in a single layer. In some examples, a multilayered tablet may include diphenyl in one layer thereof.

The diphenyl tablets of the present invention dispense diphenyl vapor in the space in which they are placed by changing directly from a solid to a gas without becoming liquid (i.e., subliming) It was found that the diphenyl vapor can provide various benefits and desirable effects, such as in areas where moisture can create problems and/or where rodents and insects are prevalent. For example, it was found that the diphenyl vapor can inhibit fungal growth, repel and/or kill insects or rodents, or prevent corrosion in a space where the diphenyl tablets are placed and where diphenyl vapor will permeate from the tablets.

It is appreciated that the space in which the diphenyl tablets are placed can include any space that can be enclosed and where the effects from the diphenyl vapor is desired. For example, the space can include a closed box, a closet, an attic, a room in a commercial or residential building, a car such as in the trunk, a storage locker or room, and the like. It also appreciated that the type and size of the space will dictate how many tablets and/or the size of the tablets that should be used. For instance, one tablet can be placed in a small space such as in a small closed box. Alternatively, for larger spaces, multiple tablets can be placed in the space for example. As indicated, the size of the tablet can be selected based on the size of the space, which may also effect the number of tablets that is necessary to provide the desired effect.

As indicated, the diphenyl tablets of the present invention can be used to repel and/or kill insects or rodents as diphenyl's smell is abhorrent to both insects and rodents. As such, the present invention includes a method of repelling or killing insects or rodents. The method comprises placing diphenyl tablets in a space that contains insects or rodents and allowing the diphenyl vapor to permeate such that the diphenyl vapor repels the insects or rodents away from the space. The diphenyl vapor can also be used to kill the insects or rodents such that the diphenyl tablets and vapor formed therefrom act as an insecticidal and/or a rodenticidal.

As previously described, the diphenyl tablets of the present invention can be used to prevent corrosion. For instance, the diphenyl vapor that permeates from the diphenyl tablets can be used to prevent corrosion (or at least reduce corrosion) of a metal substrate. Particularly, when diphenyl vapor permeates about an enclosed space, a thin layer of diphenyl can be deposited on metal substrates which inhibits oxidation and corrosion protecting the metal from contact with air and moisture. As such, the present invention includes a method of preventing corrosion of at least one metal substrate. The method comprises placing diphenyl tablets in a space that contains at least one metal substrate and coating a surface of the metal substrate with the diphenyl vapor by allowing the diphenyl vapor to permeate onto the surface of the metal substrate such that the diphenyl vapor prevents corrosion of the metal substrate. The diphenyl vapor can be used to coat an entire surface of the metal substrate or only a portion of the metal substrate. The diphenyl vapor can be used to prevent corrosion of one or multiple metal substrates that are placed in the space. It is appreciated that the metal substrate can include various types of metals and which are used to form articles, parts of a room or building, or any other area or item/article a metal substrate can be found.

As described above, the diphenyl tablets of the present invention can be used to inhibit fungal growth. For example, the diphenyl tablets of the present invention can be used to inhibit fungal growth in footwear such as various types of shoes. As such, the present invention further includes a method of preventing fungal growth in a space such as preventing fungal growth in footwear stored in the space. Thus, the space can contain footwear, and the method comprises allowing the diphenyl vapor to permeate onto an inside and/or outside portion of the footwear such that the diphenyl vapor inhibits fungal growth of the footwear. For example, the diphenyl tablet may be placed directly in footwear, such that the footwear serves as the enclosure being treated.

It is appreciated that the diphenyl tablets of the present invention can be used for various other purposes and in various types of methods. For example, diphenyl's inherent subliming can also be utilized to deliver other chemicals in vapor form. Such a method can include delivering at least two chemicals in vapor form into a space comprising placing a tablet that comprises diphenyl and a second different chemical into the space, and allowing the tablet to sublime such that both diphenyl vapor and vapor from the second different chemical permeates throughout the space.

As previously described, the inventors surprisingly found that diphenyl tablets can be used to deliver diphenyl vapor throughout the interior of an enclosure (a closed space) to provide various benefits such as to inhibit fungal growth, repel or kill insects and rodents, and prevent corrosion. The tablets are easy to use and provide consistent/long term delivery of diphenyl vapor. Affordability of product allows multiple tablets to be strategically located within each storage area. Because the tablets shrink during use, a visible confirmation of the amount of remaining product can be obtained. The shrunken tablets may also be reused.

Due to the various benefits and effects previously described, the diphenyl vapor emitting tablets provide an alternative to desiccating substances. Desiccants protect stored materials by removing moisture from the treated atmosphere, while diphenyl vapor emitting tablets protect stored materials by adding a permeating anti-fungal, anti-corrosive vapor that is also abhorrent to rodents and insects to the enclosed environment. As such, diphenyl vapor emitting tablets are an alternative for moisture removal as a method to protect moisture vulnerable materials. Moreover, desiccants stop performing when they reach moisture saturation, while diphenyl vapor emitting tablets continuously deliver diphenyl vapor over time. Desiccant packets also require adding desiccant into a permeable, formed, filled, and sealed packet, while diphenyl tablets only require a tableting step.

The following examples are presented to demonstrate the general principles of the invention. The invention should not be considered as limited to the specific examples presented. All parts and percentages in the examples are by weight unless otherwise indicated.

Example 1

Prepared of Diphenyl Tablets

Diphenyl crystal flakes purchased from Eastman Chemical Company under the product name Biphenyl, Flake (Diphenyl by Solutia) were first blended with 0.5 weight % silicone dioxide (flow additive) in a suitably sized Vee blender with an intensifier bar to break up clumps. The crystals were then compressed with a TDP-5 Desktop Tablet Press commercially available from LFA Tablet Presses at a pressure of 2 tons. One of the resulting tablets was evaluated and had a diameter of 10.40 mm, a thickness of 5.75 mm, a weight of 0.5 grams, and convex tablet shape.

Example 2

Diphenyl Tablets as an Insecticidal

Compressed diphenyl tablets were evaluated as an insecticidal. During the testing, four mini identical enclosures were prepared using 8 ounce clear plastic jars and lids. Two plastic caps serving as reservoirs for food and water were hot glued to the bottom of the jars. The smaller cap was for food, ground bran cereal flakes and ground Cheerios® cereal. The larger cap contained cotton used as a water/moisture reservoir. A length of cardboard folded into a "v" shape was added for shelter. Five 1/64" passive ventilation holes were then drilled into each of the four mini enclosed jars, 1 though the lid and 4 at staggered intervals from low to middle of the jar. Food reservoir was filled to the top. A graduated plastic pipette was used to transfer purified water from the cup to the cotton.

Diphenyl tablets were then placed into three different jars. Next, one adult German cockroach (*Blattella germanica*, purchased from Carolina Biological) was placed into each of the three jars containing the diphenyl tablets and into the control jar that did not contain any diphenyl tablets. Further, the cockroach in one of the jars was a female carrying an oothecae (eggcase).

Each of the jars previously described were stored at room temperature in an office with a thermostat setting of 70° F. The jars were stored for 12 days and the status of each cockroach was evaluated. The results of the testing are shown in Table 1.

TABLE 1

| Jar sample no. | Number of diphenyl tablets | Status of cockroach after 12 days |
|---|---|---|
| 1 (control) | 0 | Alive |
| 2 | 1 | Dead |
| 3 | more than 1 | Dead[1] |
| 4 | more than 1 | Dead |

[1]Jar 3 contained the female cockroach carrying an oothecae (eggcase). After 12 days, both the female cockroach and the roach nymphs that hatched were dead.

As shown in Table 1, the cockroaches placed in the jars containing diphenyl tablets died after 12 days, while the cockroach placed in the jar without any diphenyl tablets was found alive after 12 days. The diphenyl tablets were therefore shown to function as an insecticidal in the presence of passive ventilation.

Example 3

Evaluation of Storage Length of Diphenyl Tablets

Three large bath towels weighing a combined weight of 6.9 pounds were placed into a standard 4×1 gallon cardboard box (11.875"×11.875"×11.6875"). Next, 15 diphenyl tablets weighing a total of 13.465 grams were interspersed among the towels. The box was then taped shut. The box was stored in a heated warehouse with a temperature that varied from 50° F. to 100° F.

The towels and tablets were periodically removed from the box over 418 days so the tablets could be weighed. The weight of the tablets and the weight % loss over time are shown in Table 2.

TABLE 2

| Total Weight in grams of 15 Diphenyl Tablets | Elapsed days | Percentage of weight lost from prior weighing |
|---|---|---|
| 13.465 grams | Start of experiment (Day 1) | N/A |
| 09.945 grams | 25 days | 26.141% |
| 08.825 grams | 62 days | 11.261% |
| 06.105 grams | 123 days | 30.825% |
| 04.195 grams | 242 days | 31.228% |
| 03.180 grams | 345 days | 24.195% |
| 02.455 grams | 418 days | 22.798% |

As shown in Table 2, the diphenyl tablets exhibited good stability over time in dense materials and under environmental conditions by retaining 18.232 weight % of their original after 418 days of testing.

Example 4

Evaluation of Sublimation of Diphenyl Tablets

Two trays were fashioned from equal sized sheets of aluminum foil and tape. The trays were each weighed after fashioning, with tray 1 weighing 3.715 grams and tray 2 weighing 3.650 grams (a weight difference between trays of 0.065 grams) Two compressed diphenyl tablets handled with tweezers were first weighed at a total weight of 1.06 grams and then placed into tray 1. An equal amount of diphenyl granules (i.e., having a total weight of 1.06 grams) was spooned into tray 2.

Both trays were exposed to air over 22 days and reweighed. Tray 1 weighed 4.45 grams and tray 2 weighed 3.99 grams After adjusting the weight difference of the trays by subtracting 0.065 grams from tray 1, it can be seen that the diphenyl tablets sublimed at a slower rate than the diphenyl granules by retaining 8.88 weight % more than the granules after being exposed to air for 22 days.

The present invention is also directed to the following clauses:

Clause 1: A method for making diphenyl tablets comprising compressing diphenyl crystals into diphenyl tablets with a device that applies a selected pressure onto the crystals.

Clause 2: The method of clause 1, wherein the diphenyl crystals are compressed with a tableting machine and a tooling set comprising an internal cavity.

Clause 3: The method of any one of clauses 1 or 2, wherein the diphenyl crystals are compressed at a compressing pressure within a range of from 0.5 to 7 tons.

Clause 4: The method of any one of clauses 1-4, further comprising forming a perforation through a portion of the tablets.

Clause 5: The method of clause 4, wherein the perforation is formed through a middle of the tablets such that the tablets are formed into a shape of a ring.

Clause 6: The method of any one of clauses 1-5, wherein the tablets are formed with concave or convex sides.

Clause 7: The method of any one of clauses 1-6, wherein the method further comprises compressing at least one additional ingredient with the diphenyl crystals such that the additional ingredient is incorporated into the diphenyl tablet.

Clause 8: A diphenyl tablet formed from the method of any one of clauses 1-7.

Clause 9: A tablet comprising diphenyl, wherein the diphenyl in the tablet is formed from compressed diphenyl crystals.

Clause 10: The tablet of clause 9, wherein the tablet comprises at least one concave or convex side.

Clause 11: The tablet of clauses 9 or 10, wherein the tablet comprises at least one perforation formed through at least a portion of the tablet.

Clause 12: The tablet of clause 11, wherein the perforation is formed through a middle of the tablet such that the tablet is in a shape of a ring Clause 13: The tablet of any one of clauses 9-12, wherein the tablet comprises 100 weight % of diphenyl, based on the total weight of the tablet.

Clause 14: The tablet of any one of clauses 9-12, wherein the tablet comprises less than 100 weight % of diphenyl, based on the total weight of the tablet.

Clause 15: The tablet of any one of clauses 9-14, wherein the tablet further comprises at least one ingredient selected from the group consisting of binders, lubricants, flowing agents, glidants, lubricants, fragrances, bittering agents, hardeners, and mixtures thereof.

Clause 16: The tablet of any one of clauses 9-15, wherein the tablet further comprises a bittering agent selected from the group consisting of denatonium benzoate, denatonium saccharide, and combinations thereof.

Clause 17: A method of inhibiting fungal growth, repelling or killing insects or rodents, or preventing corrosion in a space comprising placing a tablet according to any one of clauses 9-16 into the space and allowing diphenyl vapor to permeate from the tablet throughout the space.

Clause 18: The method of clause 17, wherein the space contains insects or rodents, and wherein the method comprises allowing the diphenyl vapor to permeate such that the diphenyl vapor repels the insects or rodents away from the space and/or kills the insects or rodents.

Clause 19: The method of clause 17, wherein the space contains at least one metal substrate, and wherein the method comprises coating a surface of the metal substrate with the diphenyl vapor by allowing the diphenyl vapor to permeate onto the surface of the metal substrate such that the diphenyl vapor prevents corrosion of the metal substrate.

Clause 20: The method of clause 17, wherein the space contains footwear, and wherein the method further comprises allowing the diphenyl vapor to permeate onto an inside and/or outside portion of the footwear such that the diphenyl vapor inhibits fungal growth of the footwear.

Clause 21: A method of delivering at least two chemicals in vapor form into a space comprising placing a tablet according to any one of clauses 9-16 and which further comprises a second different chemical formed in the tablet, into the space, and allowing the tablet to sublime such that both diphenyl vapor and vapor from the second different chemical permeate throughout the space.

Whereas particular embodiments of this invention have been described above for purposes of illustration, it will be evident to those skilled in the art that numerous variations of the details of the present invention may be made without departing from the invention as defined in the appended claims. Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment or aspect can be combined with one or more features of any other embodiment or aspect.

What is claimed is:

1. A method of inhibiting fungal growth, repelling or killing insects or rodents, or preventing corrosion in an enclosed space comprising placing a diphenyl tablet into the enclosed space and allowing diphenyl vapor to permeate continuously over time until expended from the tablet into air throughout the enclosed space, wherein the tablet comprises diphenyl and wherein the diphenyl in the tablet is formed from compressed diphenyl crystals, wherein the enclosed space contains at least one metal substrate, and wherein the method comprises coating a surface of the metal substrate with the diphenyl vapor by allowing the diphenyl vapor to permeate onto the surface of the metal substrate such that the diphenyl vapor prevents corrosion of the metal substrate.

2. The method of claim 1, wherein the enclosed space further contains insects or rodents, and wherein the method comprises allowing the diphenyl vapor to permeate such that the diphenyl vapor repels the insects or rodents away from the enclosed space and/or kills the insects or rodents.

3. The method of claim 1, wherein the enclosed space further contains footwear, and wherein the method further comprises allowing the diphenyl vapor to permeate onto an inside and/or outside portion of the footwear such that the diphenyl vapor inhibits fungal growth of the footwear.

4. The method of claim 1, wherein the tablet comprises at least one concave or convex side.

5. The method of claim 1, wherein the tablet comprises at least one perforation formed through at least a portion of the tablet.

6. The method of claim 4, wherein the perforation is formed through a middle of the tablet such that the tablet is in a shape of a ring.

7. The method of claim 1, wherein the tablet comprises 100 weight % of diphenyl, based on the total weight of the tablet.

8. The method of claim 1, wherein the tablet comprises less than 100 weight % of diphenyl, based on the total weight of the tablet.

9. The method of claim 7, wherein the tablet further comprises at least one ingredient selected from the group consisting of binders, flowing agents, glidants, lubricants, fragrances, bittering agents, hardeners, and mixtures thereof.

10. The method of claim 7, wherein the tablet further comprises a bittering agent selected from the group consisting of denatonium benzoate, denatonium saccharide, and combinations thereof.

* * * * *